April 9, 1963  C. E. O'DONNELL  3,084,695
METHOD OF MAKING ARCH SUPPORTING CUSHION INNERSOLE
Filed Aug. 1, 1961  3 Sheets-Sheet 1

INVENTOR.
Charles E. O'Donnell
BY
Kenway, Jenney & Hildreth,
Attys

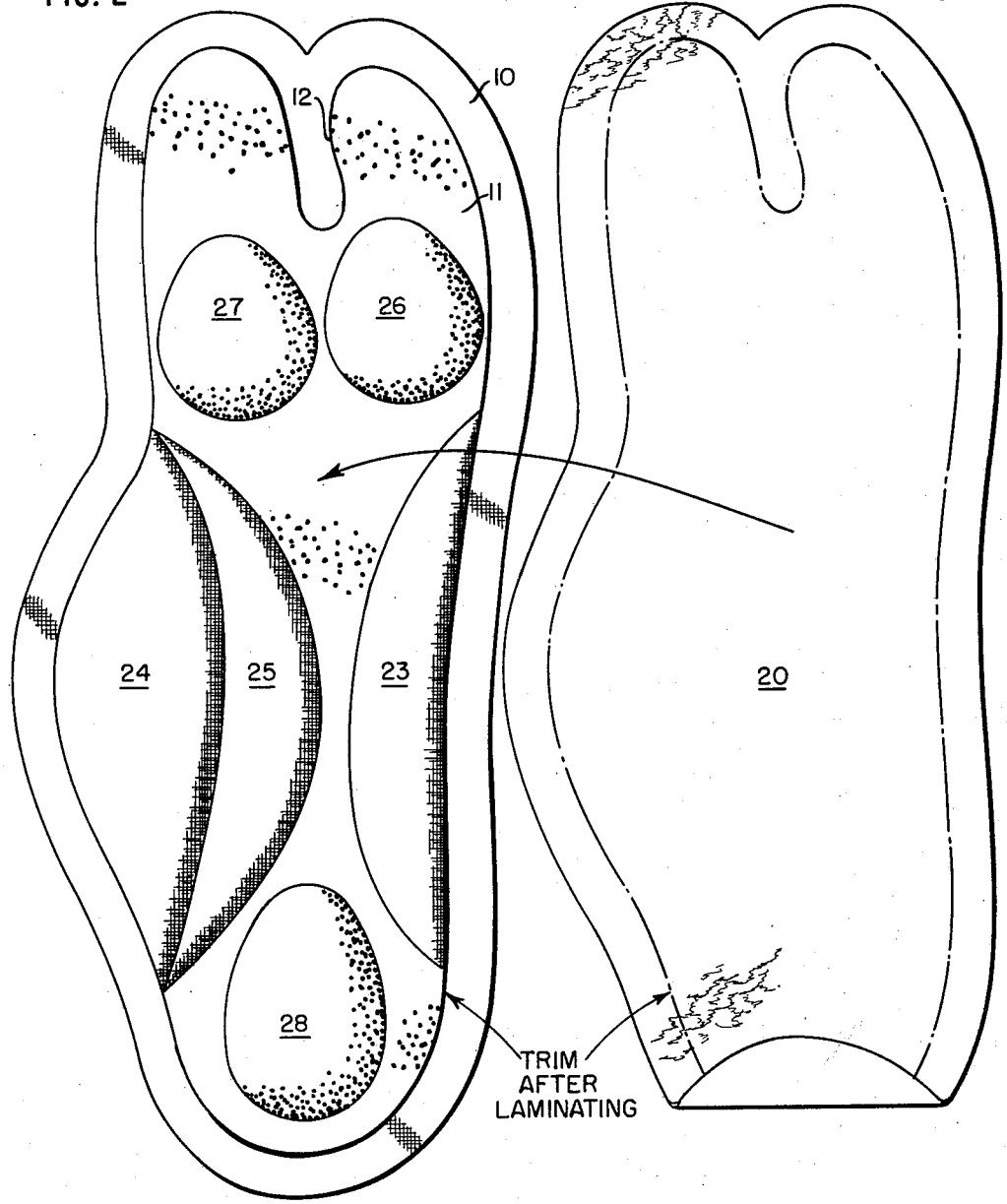

April 9, 1963  C. E. O'DONNELL  3,084,695
METHOD OF MAKING ARCH SUPPORTING CUSHION INNERSOLE
Filed Aug. 1, 1961  3 Sheets-Sheet 3
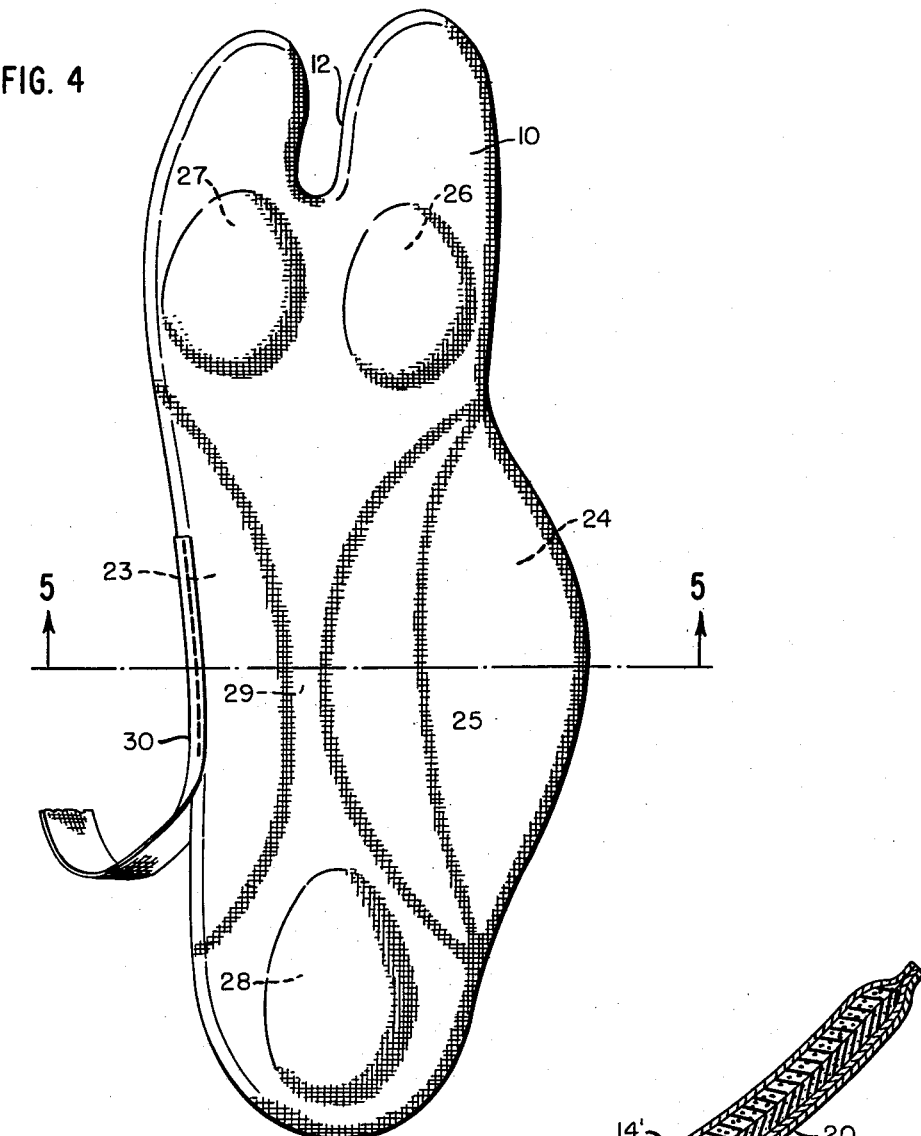
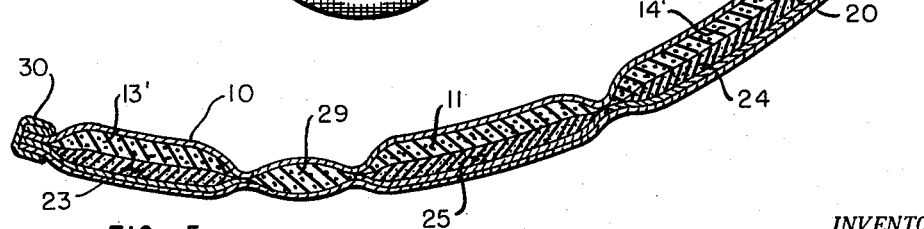

3,084,695
METHOD OF MAKING ARCH SUPPORTING CUSHION INNERSOLE
Charles Edward O'Donnell, 18740 NW. 19th Ave., Opa Locka, Fla.
Filed Aug. 1, 1961, Ser. No. 128,532
1 Claim. (Cl. 128—615)

This invention comprises a new and improved method of making an arch supporting cushion innersole which has been found to give an unexpected degree of comfort to wearers suffering from foot trouble by supplying cushion support in specially selected areas of the foot.

The innersole of my invention employs as one of its components an intermediate sheet of sponge rubber having curved channels therein that define segmental areas in both inside and outside marginal shank portions. The channeled sheet is interposed together with selected pads between upper and under plies with the result that the pads form bulging areas definitely located by the break lines formed by the channels aforesaid.

This novel innersole is further characterized in that its toe portion is forked so as to give it toe supporting parts capacity for lateral or transverse accommodation.

These and other features of the invention will be best understood and appreciated from the following description of a preferred embodiment thereof, selected for purposes of illustration and shown in the accompanying drawings in which:

FIG. 2 is a bottom plan view of the top ply with applied pads,

FIG. 3 is a bottom plan view of the ply,

FIG. 4 is a plan view of the innersole showing a partially attached binding, and FIG. 5 is a sectional view on the line 5—5 of FIG. 4 on a substantially enlarged scale.

Figure 1:
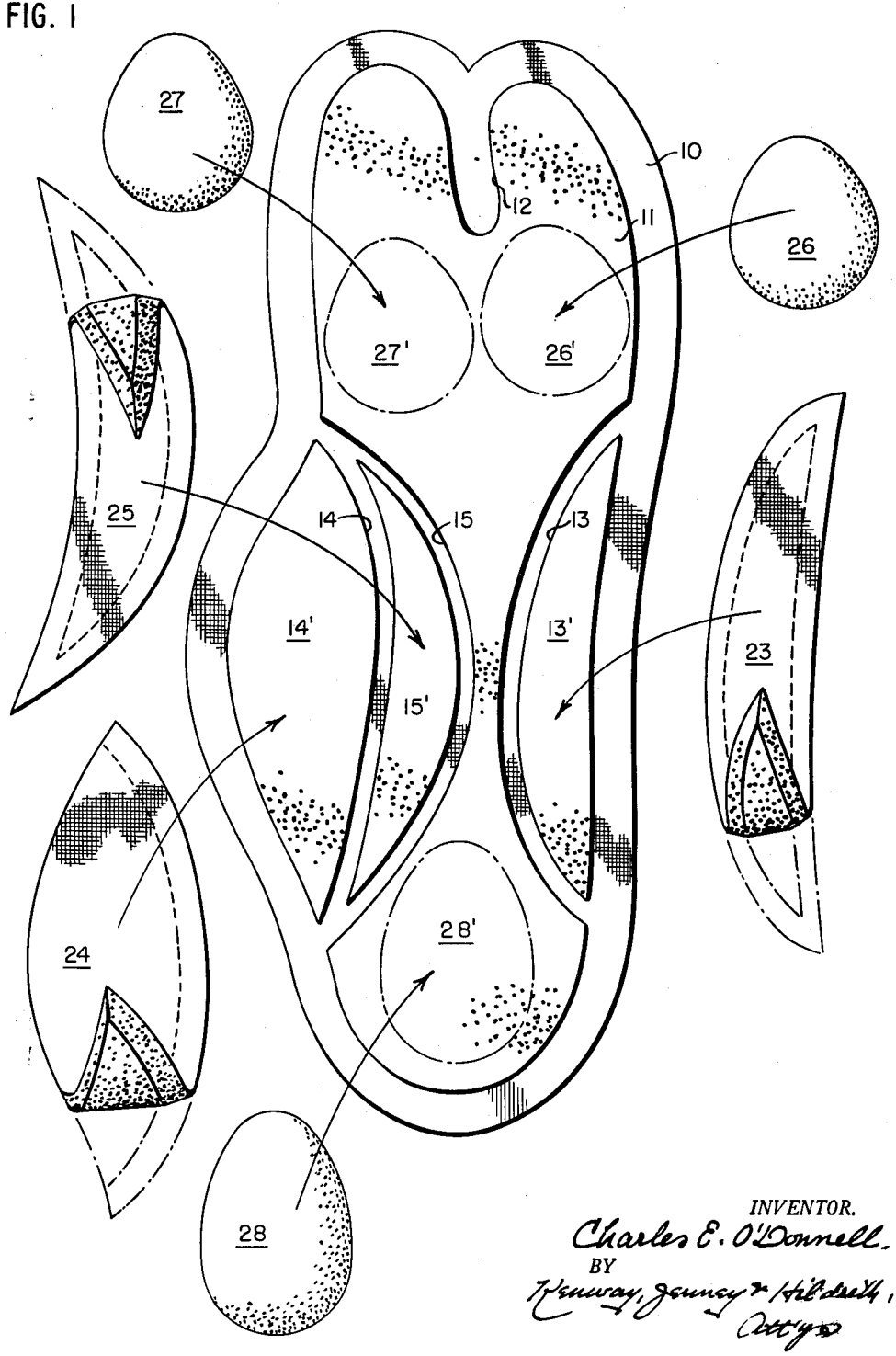
FIG. 1 is a diagrammatic bottom view of the top ply with its component parts.

In constructing the innersole of the present invention the top ply 10 is first cut from suitable woven fabric such as faille and to the inner face of this is adhesively secured a sheet blank 11 of sponge rubber of similar contour but slightly smaller so that a marginal band of the ply 10 is exposed. The sponge rubber sheet 11 is formed with a deep reentrant slot 12 thus imparting a forked configuration to the toe end of the blank. A curved outwardly concaved channel 13 is formed in the sheet rubber blank and this defines a segmental area 13' in the outside shank portion of the innersole. In the inside shank portion of the blank 11 are formed curved channels 14 and 15 both outwardly concave. The channel 14 of larger radius defines an elliptical area 14' which will cover the outer part of the so-called cookie area of the innersole. The channels 14 and 15 together define a crescent-shaped area 15' and the break line formed by the channel 15 determines the inner line of the cookie area.

The sponge rubber blank 11 has circular areas 27' and 26' laid out and marked beneath the metatarsal portion of the innersole. It also has an elliptical area 28' marked out in its heel seat area between the diverging rear ends of the channels 13 nd 15.

The various pads which are to be adhesively secured to these marked areas are separately shown in FIG. 1. They are formed of sponge rubber and may or may not have individual fabric covers. The segmental pads 23–25 are represented as having thin textile covers and bevelled or skived marginal edges. It would be understood that the pads are of flexible cushion consistency and are sufficiently porous to insure ventilation of the completed innersole. From the manufacturing standpoint it has been found convenient to prepare the laminated top ply as shown in FIG. 1 having the pad locations marked therein by the channels in the sponge rubber sheet so that the pads may be rapidly and accurately located and secured in their positions as indicated by the arrows in FIG. 1.

In FIG. 2 the top ply is shown with the various pads 23–28 secured in their proper locations and it will be seen that the pads 23 and 25 are wider than the areas 13' and 15' defined by the channels so that they overlap and cover the channels 13 and 15. The other side of the top ply which is to engage the foot of the wearer presents a plain flat woven surface at this time as shown in FIG. 3.

Having prepared the top ply as above explained, it is now assembled with a correspondingly shaped bottom ply 20 and this may be of split leather, artificial leather or flexible fiber-board. It is adhesively secured to the pads of the top ply and to the intermediate areas thereof and in this operation the top and bottom plies are brought into close conformity along the lines of the channels 13–15 and caused to bulge in the form of thick cushions as shown in FIG. 5. The innersole thus presents in cross section an upwardly deflected pad 23 at the outside shank, connected pads 24 and 25 serving as a cookie support and cushion at the inside shank, and a narrow longitudinal bulge 29 caused by uniting the top and bottom plies along the lines of the channels 13 and 15. Having united the top and bottom plies as thus explained the margin of the innersole may be trimmed and provided with a binding strip 30 as suggested in FIG. 4.

The bottom ply 20 is cut out from sheet material in substantially the same shape as the top ply 10 so that the two plies make direct adhesive contact in a continuous marginal band in addition to their areas of contact and adhesion in all areas between the interposed pads. The trimming step reduces the width of the marginal adhesive band and gives the innersole its final outline.

The effect of uniting the top and bottom plies with their interposed pads is to produce a molded contoured cushion surface for contact with the wearer's foot and this contour is, of course, modified to some extent in wear, taking the impression of the sole it supports. It is apparent that the innersole above described may be made in all different sizes to accommodate the whole family.

Having thus disclosed my invention and described in detail an illustrative embodiment thereof, I claim as new and desire to secure by Letters Patent:

The method of making arch-supporting cushion innersoles, comprising the steps of forming a sole-shaped sponge rubber sheet with a reentrant slot at the toe end and with curved channels defining segmental areas, laminating the upper portion of the channeled sponge rubber sheet to an outer top foot-engaging ply of fabric, adhesively attaching segmental cushion pads to the segmental areas of the sponge rubber sheet in positions overlapping and covering the channels, and then securing a bottom ply of leather-like material to the pads, to a continuous marginal area of the top ply, and to the intermediate areas of the top ply in close conformity along the lines of the curved channels, thereby causing the pads to bulge in cushion formation.

References Cited in the file of this patent
UNITED STATES PATENTS

| | | |
|---|---|---|
| 2,220,439 | Block | Nov. 5, 1940 |
| 2,965,984 | Scholl | Dec. 27, 1960 |